United States Patent [19]

Irwin

[11] 4,143,111
[45] Mar. 6, 1979

[54] METHOD OF MATCHED-MOLD FORMING FROM A HOT SHEET OF POLYSTYRENE FOAM, AN OPEN VESSEL HAVING AN OUTWARD SLOPING FLAT SIDE WALL WITH AT LEAST ONE HOLE IN SAID SIDE WALL

[76] Inventor: Jere F. Irwin, 1702 S. 24th Ave., Yakima, Wash. 98902

[21] Appl. No.: 571,275

[22] Filed: Apr. 24, 1975

[51] Int. Cl.$^2$ .................. B29C 17/10; B29D 27/00
[52] U.S. Cl. ................................ 264/156; 229/2.5 EC; 264/321
[58] Field of Search ............... 264/321, 154, 155, 156; 229/2.5 EC

[56] References Cited

U.S. PATENT DOCUMENTS

| | | | |
|---|---|---|---|
| 1,972,789 | 9/1934 | Newkirk | 264/153 |
| 2,045,471 | 6/1936 | Kasen | 264/153 |
| 2,722,719 | 11/1955 | Altstadter | 264/155 |
| 3,055,275 | 9/1962 | Schroter | 264/155 |
| 3,326,443 | 6/1967 | Burkett | 264/321 X |
| 3,475,526 | 10/1969 | Seto | 264/321 X |
| 3,504,074 | 3/1970 | Snow | 264/155 |
| 3,518,334 | 6/1970 | Carrigan et al. | 264/321 X |
| 3,577,495 | 5/1971 | Pearl et al. | 264/153 X |
| 3,640,668 | 2/1972 | Brown et al. | 264/321 X |
| 3,649,728 | 3/1972 | Honsho et al. | 264/156 X |
| 3,793,424 | 2/1974 | Haga | 264/154 |
| 3,830,611 | 8/1974 | Irwin | 425/144 |
| 3,845,187 | 10/1974 | Dahlberg | 264/154 |
| 3,876,361 | 4/1975 | Irwin | 425/451.6 |

OTHER PUBLICATIONS

"The Encyclopedia of Patent Practice and Invention Management", edited by Robert Calvert, New York, Reinhold, 1964, pp. 138–142.

Primary Examiner—Philip Anderson
Attorney, Agent, or Firm—Dana E. Keech

[57] ABSTRACT

A hinged carton integrally molded of polystyrene foam and adapted to be locked shut by a flap extending upwardly from the bottom part of the carton inside a side wall of the carton cover and carrying one or more prongs so that the latter will be biased outwardly to snap into a corresponding number of holes provided in said cover side wall, the ruggedness of said carton being materially enhanced over similar cartons of the prior art by the local beefing up of said cover side wall in the immediate areas bordering said holes incidental to the functioning of a novel method of and apparatus for manufacturing said carton. Said apparatus is embodied optionally in a forming tool or in a form-and-trim tool and embraces relatively vertically reciprocable carton shaping matched-molds operating on a heated thermoplastic web of polystyrene foam to produce one or more entire cartons with each reciprocation. In said method each hole in said cover side wall is formed by two matching wedge shaped cylindrical scissor blades which extend from the male and female matched molds to slide together face-to-face in a plane parallel with the direction the molds approach and separate from each other to comprise a hole-forming plug when said molds arrive at their final carton molding positions of proximity, said scissor blades being then mutually slidingly withdrawn vertically in opposite directions from the cover side wall hole formed thereby as the molds are separated vertically during the second half of a carton forming reciprocation, to release the carton from between the molds. The aforementioned beefing up of said cover side wall is enhanced by recessing the internal carton side wall forming faces of said molds in the areas thereof immediately adjacent to said scissor blades.

2 Claims, 11 Drawing Figures

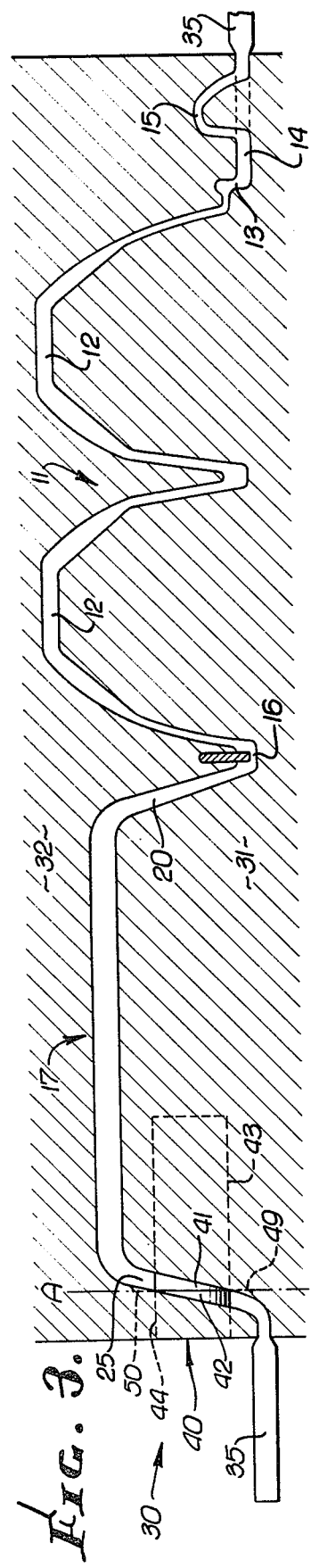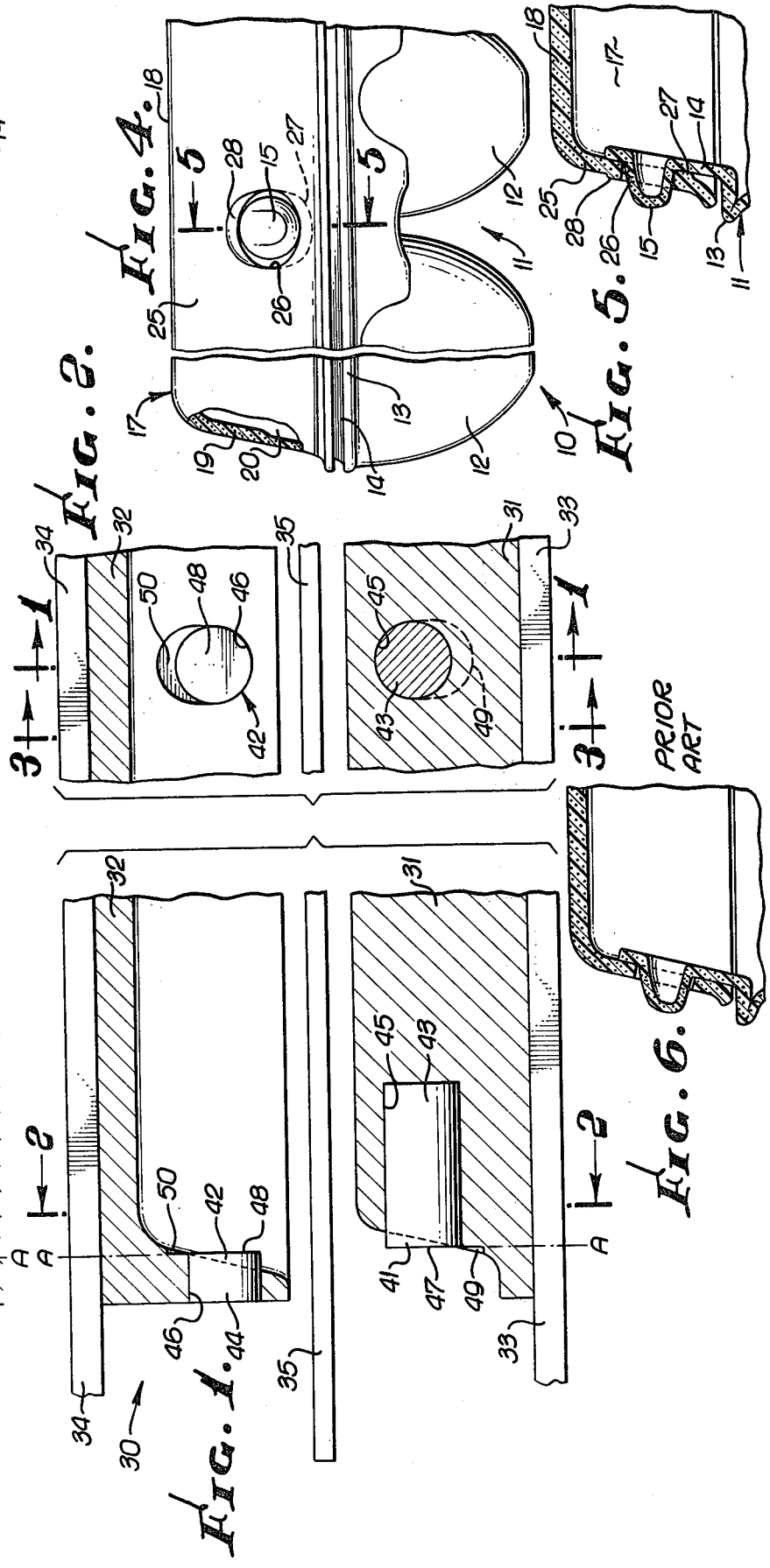

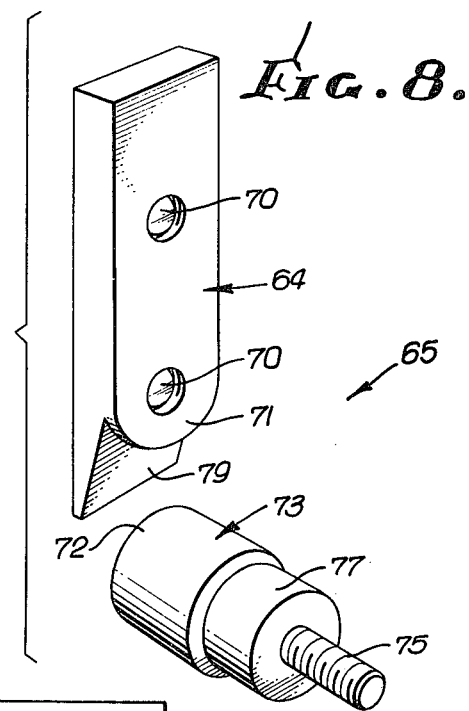
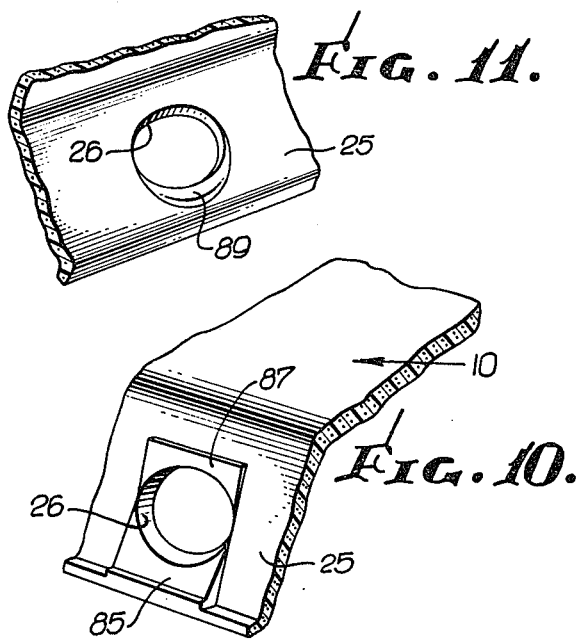
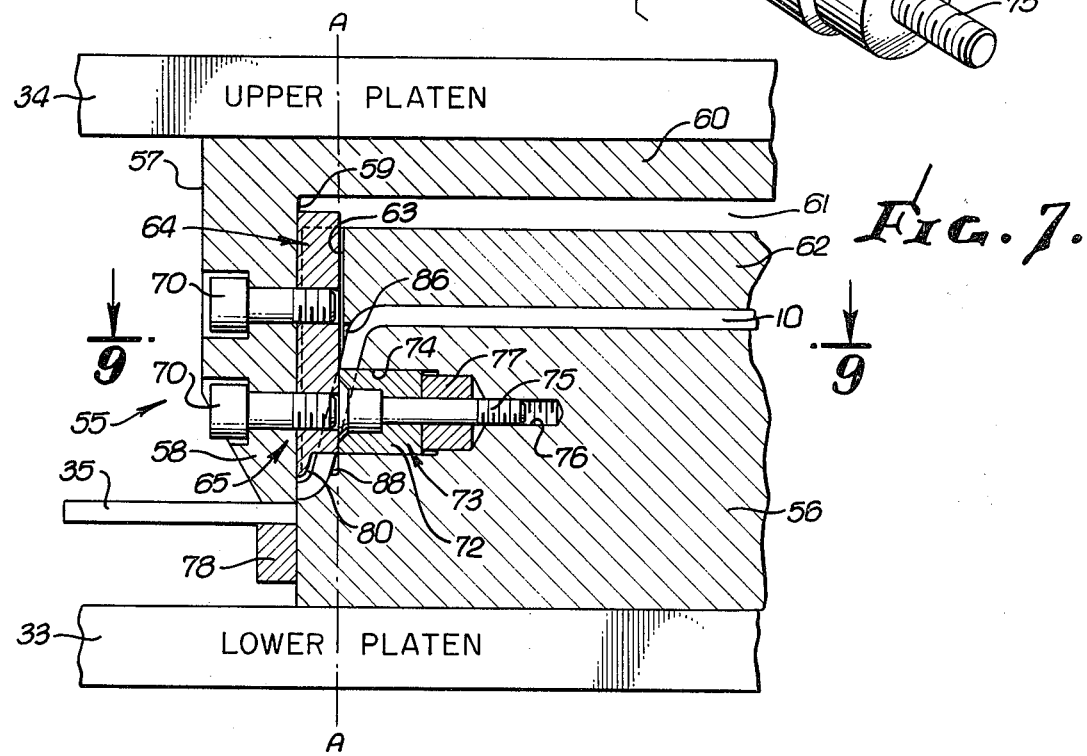
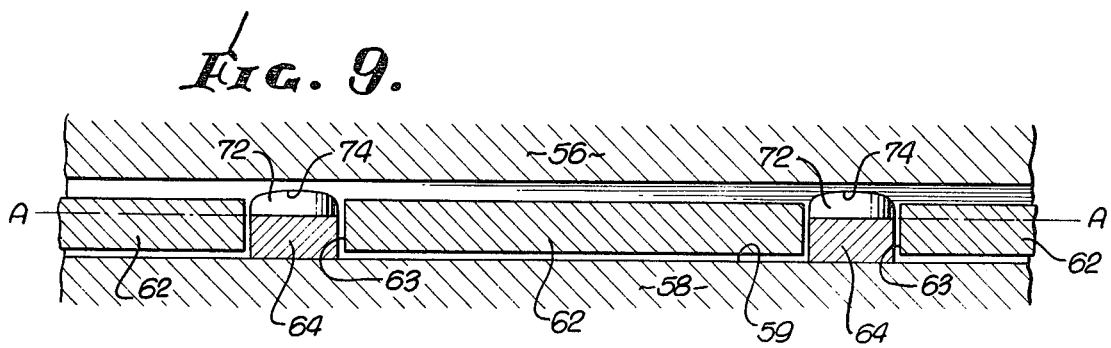

METHOD OF MATCHED-MOLD FORMING FROM A HOT SHEET OF POLYSTYRENE FOAM, AN OPEN VESSEL HAVING AN OUTWARD SLOPING FLAT SIDE WALL WITH AT LEAST ONE HOLE IN SAID SIDE WALL

SUMMARY OF THE INVENTION

Heretofore, when the latch holes provided in manufacturing said hinged polystyrene foam cartons of the type most generally used for packaging eggs, the side wall of the carton cover was left blank when the carton was thermoformed in an automatic press between matched molds and the latch prong receiving holes were then formed near the lower edge of said side wall by a separate punching operation. This complexity in the method of manufacture of this particular style of egg carton increased the cost thereof and made it difficult to accomplish the accurate registry of the latch holes with the prongs. Inasmuch as said holes are located quite close to the lower edge of the carton cover side wall in which they were formed, the prior method of manufacturing this particular style of carton made it difficult to provide the lower edge of the side wall opposite these holes with sufficient bulk to prevent said areas rupturing, allowing the escape of said prongs from said holes.

It is a principal object of the invention is to provide a method of manufacturing the aforesaid carton employing an automatic press and utilizing the approach of matched molds upon a heated sheet of polystyrene foam to pierce said sheet in the area where a locking hole is desired and then expanding the hole thus initiated to the desired size by radially compacting in opposite directions from the point where said sheet is pierced, the material removed to form said hole in the immediately surrounding area of the carton cover wall.

A still further object of the invention is to provide such a method in which the piercing of said sheet is done by wedge shaped shear blades fixed respectively to inner faces of said matched molds, which blades unite to form a pair of scissors to pierce said sheet and then slide together face-to-face, to form a hole molding core plug occupying the space between said molds within which said hole is desired, at the moment of maximum proximity of said matched molds, said blades being withdrawn in opposite directions vertically from said hole by the ensuing reciprocal withdrawal of said matched molds to their respective starting positions.

BRIEF DESCRIPTION OF THE DRAWINGS

FIG. 1 is a diagrammatic vertical sectional view of a pair of matched egg carton forming molds rigidly secured to the upper and lower platens of an automatic press and with a preferred simple form of the apparatus of the invention incorporated with said molds and with said molds separated by a horizontal sheet of heated polystyrene foam at an instant just preceding the approach of said molds incidental to a molding cycle of said press to form said carton.

FIG. 2 is a diagrammatic vertical cross sectional view taken on the line 2—2 of FIG. 1 at the same instant in the carton molding cycle shown in FIG. 1.

FIG. 3 is a diagrammatic vertical sectional view taken on the line 3—3 of FIG. 2 at the instant at which said molds arrive at their maximum positions of proximity in the molding of said cartons and showing the wedge shaped scissor discs of the invention which are mounted to extend inwardly from opposing faces of said matched molds with said discs in axial alignment and in vertical face-to-face sliding relation so as to unite to form the molding plug of the apparatus constituting a core for the molding of a latching hole in said carton side wall.

FIG. 4 is a fragmentary side elevational view of a preferred embodiment of the foldable and lockable egg carton of the invention and shows the same closed by one of the novel reinforced cover locking means of said carton.

FIG. 5 is a fragmentary vertical cross sectional view taken on the line 5—5 of FIG. 4 and illustrates the reinforcement of the cover side wall of the carton of the invention in the areas immediately surrounding each hole provided in said wall.

FIG. 6 is a view similar to FIG. 5 and illustrates the structure of a hinged and lockable polystyrene foam egg carton as found in the prior art.

FIG. 7 is a view similar to FIG. 3 and illustrates a modified form of the apparatus of the invention in which one of the scissor elements of the tooling is in the form of a plate and the other element is in the form of a cylindrical disc.

FIG. 8 is an exploded diagrammatic perspective view of the two scissor elements employed in the form of the apparatus shown in FIG. 7 with these elements separated vertically at a particular point in the vertical reciprocation of said elements relative to each other.

FIG. 9 is a diagrammatic horizontal sectional view taken on the line 9—9 of FIG. 7 and illustrating the manner in which the upper or female matched mold is provided with a carton forming insert which is freely shiftable relative to the male matched mold and relative to the scissor plate of the hole forming apparatus for reasons which will be pointed out hereinafter.

FIG. 10 is a diagrammatic perspective fragmentary exterior view of a portion of said carton and illustrates how the method and apparatus of the present invention is adapted to beef up the areas of the side wall of the carton top in which said hole is formed by reinforcing said side wall in the area immediately surrounding one of said holes by fattening said areas outwardly from said hole.

FIG. 11 is an interior fragmentary perspective view similar to FIG. 10 and illustrating the manner in which the invention strengthens the areas of said carton side wall immediately surrounding the hole formed therein by welts or the like fattening said wall areas and protruding inwardly from said wall.

DETAILED DESCRIPTION OF THE PREFERRED EMBODIMENT

The egg carton 10 produced by the invention includes a bottom part 11 in which twelve egg cups 12 are integrally united in two rows of six such cups, each cup being adapted to contain a single egg. Joined integrally to one side of the carton bottom part 11 by a thin hinge 13 is a flap 14 having a pair of hollow prongs 15 formed therein. Integrally connected to the opposite side edge of bottom part 11 by a hinge 16 is a cover 17 for the bottom part of the carton. The cover has the shape of a shallow pan with a flat top wall 18, end walls 19 and side walls 20 and 25. The bottom edge of side wall 20 is connected by the hinge 16 to the bottom part 11 while the bottom edges of end walls 19 and side walls 25 are free. When the carton 10 is closed as shown in FIG. 4, the end walls 19 and side walls 20 and 25 of the cover 17 are preferably inclined from vertical at an angle of approximately 13°.

The closing of the carton 10 as shown in FIG. 4 is accomplished by swinging the cover 17 about the hinge 16 so as to bring it into covering relation with the bottom part 11 of the carton while the flap 14 is swung inwardly about the hinge 13 so that the flap 14 and prongs 15 will be received upwardly inside the cover side wall 25. The wall 25 is provided by the method of its manufacture with a pair of holes 26 so as to be directly opposite the positions of the prongs 15 when the cover 17 and bottom part 11 of the egg carton are brought together. This causes the prongs 15 which are biased outwardly by the springy character of the hinge 13 to snap into the holes 26 and lock the carton closed.

It is now to be noted in FIGS. 4 and 5 that the hole 26 shown in these views is slightly eliptical on a horizontal axis; that the side wall 25 in the area immediately adjacent to and below said hole is provided with a crescent shaped reinforcement 27 which is formed integral with and on the inside face of side wall 25 in the process of forming said hole as will be made clear in the description of the method of the invention. It is also to be noted that a similar upper crescent shaped reinforcement 28 is formed integral with the side wall 25 in the area thereof immediately above hole 26 and which extends outwardly from said side wall. These two crescent shaped reinforcements in the side wall 25 substantially strengthen the locking means provided by the combination of the holes 26 and prongs 15 in the structure of the carton 10.

METHOD OF THE INVENTION

This method has to do with the manufacture of the egg carton 10 and preferably employs an automatic press, which is not shown inasmuch as a press highly suitable for use in performing the method of the invention is illustrated in my U.S. Pat. No. 3,830,611 issued Aug. 20, 1974 and No. 3,876,361 issued Apr. 8, 1975.

The preferred apparatus 30 shown in FIGS. 1, 2 and 3 comprises a form-tool including male and female matching molds 31 and 32 which are rigidly mounted respectively on lower and upper platens 33 and 34 of the automatic press whereby the operation of the press causes the molds 31 and 32 to be mutually reciprocated towards each other from opposite sides of a hot sheet of polystyrene foam 35 which is periodically advanced between said molds so as to provide the foam plastic material required for the molding of one or more egg cartons of the invention with each reciprocation of said molds.

The matching molds 31 and 32 of the apparatus 30 of the invention, as previously noted, are shown in open position in FIG. 1 and in closed position in FIG. 3 and function, during each reciprocation of the press, to produce one or more cartons 10 in the material of the sheet 35 without separating said cartons from said sheet. Each carton forming reciprocation of the press concludes with the matching molds 31 and 32 separated as shown in FIG. 1 whereupon the sheet feeding mechanism of the press feeds sheet 35 to shift the carton just formed therein past the molding apparatus 30. In the next reciprocation of the press, to produce a new carton, a separate trim die (not shown) is brought into action to trim from the sheet 35 the carton or cartons previously molded by the press in the sheet 35 and the scrap remaining in the sheet continues past the trim die to a disintegrator (not shown) which reduces the scrap to shreds which are recycled through the machinery employed for producing the polystyrene foam sheet 35.

The function of the molding apparatus 30 is thus confined to the molding of cartons from the sheet 35 and the separation of the molded articles from said sheet is left to a carton trimming apparatus (not shown) which operates on the sheet 35 coordinately with the operation of the molding apparatus 30 thereon after the sheet 35 has passed through the apparatus 30.

In each carton forming reciprocation of the matched molds 31 and 32 of the molding apparatus 30 to produce a carton 10 of the invention, said molds not only produce the carton but they form the two matching holes 26 in the side wall 25 of the cover 17 of the carton. Each of these holes is produced in said carton molding operation by a scissor mechanism 40 which comprises two like cylindrical wedge shaped scissor blades 41 and 42 which preferably constitute inner end portions of cylindrical scissor dies 43 and 44 which are mounted in horizontal holes 45 and 46 formed respectively in matched molds 31 and 32. The scissor blades 41 and 42 extend towards each other and terminate in inner vertical faces 47 and 48 which are disposed in very close parallel relation with a vertical plane A—A shown in FIGS. 1 and 3. The faces 47 and 48 are thus located in such a closely spaced relation that said faces for all practical purposes may be considered as in sliding relation with each other when the molds 31 and 32 approach each other in a carton forming operation so that the blades 41 and 42 are referred to as scissor blades. It is clear therefore that as the molds 31 and 32 approach each other to accomplish the molding of a carton from the sheet 35, the two blades 41 and 42 act as a cylindrical pair of scissors which operate by a shearing action to cut a slit in the sheet 35 and then, as the blades 41 and 42 slide face-to-face in to their matching relation as shown in FIG. 3, said blades come into horizontal alignment to produce a hole forming core which produces one of the holes 26 in the carton cover side wall 25.

The polystyrene foam material in a sheet 35 which is displaced by the scissor blades 41 and 42 in this operation is radially expanded from the area in which the shearing mechanism 40 forms a hole 26 so as to increase the density of the material of the sheet 35 in the area of the carton cover side wall 25 which immediately surrounds the hole 26. This operation strengthens the wall 25 in the critical areas thereof immediately surrounding the holes 26. This excess material may also be utilized for the forming of the aforementioned crescent shaped reinforcing ribs 27 and 28 as shown in FIGS. 4 and 5, by forming crescent shaped molding recesses 49 and 50 in the inner edges of holes 45 and 46 into which the material of the sheet 35 displaced by the scissor blades 41 and 42 is forced incidental to the carton molding operation.

The one or more cartons 10 produced in the sheet 35 by the approach of the molds 31 and 32 towards each other to their ultimate positions of proximity as shown in FIG. 3, are readily stripped from the molds by suitable air jets introduced, in the well known manner, between the respective molds 31 and 32 and said carton.

Referring now to FIGS. 7, 8, 9, 10 and 11, a modified mold apparatus 55 is disclosed. This apparatus is preferably provided for use in automatic presses of the type disclosed in my aforementioned U.S. Letters Patent and functions to not only mold the carton and form the latch holes in a side wall of the carton cover, but also coincidental with and as a part of each molding operation, performs the trim step of substantially completely separating from the sheet 35 the carton, so molded.

The mold apparatus 55 includes male and female matching molds 56 and 57 which are rigidly fixed respectively in proper vertically matching relation to the lower and upper platens 33 and 34 of the automatic press employed in the molding operation. In the apparatus 55, the female matching mold has a peripheral die 58 which cooperates with the lower portion of the male matching mold 56 to perform the trim step which substantially completely separates from the polystyrene foam sheet 35 the carton molded with each reciprocation of the platens 33 and 34. This shearing relation between the die 58 and the male mold 56 is produced by the vertical alignment of the inner face 59 of said die with said male mold. The die 58 unites at its upper end with the base 60 of the female matching mold 57 which is secured rigidly to the upper platen 34 of the press. The elements 58 and 60 of the female mold 57 provide a chamber 61 in which a female carton forming element 62 is loosely mounted and spring biased towards the male mold 56 so as to cooperate with the latter in forming a carton with each reciprocation of the lower and upper platens relative to each other in the operation of the press. Thus, while the male mold 56 and female mold 57 are respectively rigidly united to the lower and upper platens 33 and 34 of the press, the female forming member 62 of the female matching mold is loosely related to both of the matching molds so as to accommodate it to variations in pressure to which the said matched molds are subjected in the carton molding operation.

The forming element 62 has a pair of vertical slots 63 formed therein as shown in FIGS. 7 and 9 for loosely accommodating scissor plates 64 comprised in a pair of scissor mechanisms 65. As these mechanisms are duplicates of each other, a description of one will suffice for both. Each scissor plate 64 is secured to die 58 by a pair of screws 70 and has near its lower end formed co-axially with the lower of said screws, a semi-cylindrical scissors blade 71 which is positioned so as to produce a vertically sliding relation between the inner vertical face of said scissor plate and the corresponding inner vertical surface of a cylindrical scissor blade 72 provided on a cylindrical scissor die 73 which is rigidly held in a horizontal hole 74 formed in the male matched mold 56 by a bolt 75. The inner end of this bolt screws into a tapped hole 76 formed in said male matched mold 56, said bolt being surrounded by a set of shims 77 for properly positioning the scissor blade 72 in precise shearing relation with scissor blade 71.

It is to be noted that this precision is attainable by virtue of the fact that the scissor plate 64 is rigidly mounted on the female matched mold 56 which in turn is rigidly mounted on the upper platen 34 and the cylindrical scissor die 73, which provides the scissor blade 72 of the scissor mechanism 65, is rigidly mounted on the male matched mold 56 which in turn is rigidly fixed to the lower platen 33 of the press. The precise operation of the scissor mechanism 65 is thus assured in the modified mold apparatus 55 while at the same time permitting the molding function of the female matching mold 57 to be accomplished by a forming element 62 which is freely adjustable within said matched mold so as to facilitate the proper accommodation of the two molds to each other in the forming of a carton.

The mold apparatus 55 also embodies a stripper 78 which strips the sheet 35 from the male matching mold 57 to facilitate the feeding of said sheet, and the carton thus formed therefrom, out from between matched molds 56 and 57 while the latter are separated between molding strokes of the press.

Each scissor plate 64 has a tapering tail piece 79 which can be made to conform approximately to the contour of the inner surface of the forming element 62 of the male mold 56 or it can be relieved so as to form a molding space 80 which in the molding of the carton will produce a reinforcing boss 85 on the exterior surface of the side wall 25 of the cover of the carton 10 as shown in FIG. 10. Likewise, it is optional in the performance of the method of the invention and in making the modified mold apparatus 55 thereof, to remove a thinner portion of the forming element 62 of the female mold 57 to produce a molding space or recess 86 which will form, in the molding of a carton 10, a reinforcing boss 87 on the opposite side of the hole 26 from the boss 85. The male matching mold 56 may likewise be provided with a semi-circular recess 88 in the inner edge of the cylindrical hole 74, which recess will accomplish the molding, in the formation of a carton, of a crescent shaped rib 89 immediately adjacent to the hole 26 in the carton and on the inner face of the side wall 25 of the cover of the carton as shown in FIG. 10.

The claims are:

1. A method of matched-mold forming from a hot sheet of polystyrene foam an open vessel having an outwardly sloping flat side wall with at least one hole in said side wall, said hole being formed during the molding of said vessel and without requiring the aid of accessory power punching equipment, said method comprising the steps of:

providing mounted vertically reciprocating aligned male and female matched molds which when brought together define the internal and external surfaces of said vessel;

providing on those portions of said matched molds opposite which it is desired said hole be formed, wedge shaped half-plugs which are in slidably offset relation with each other and form a pair of scissors and a whole plug when moved into conjunction with each other by the reciprocation of said molds;

advancing a hot sheet of polystyrene foam between said matched molds; and reciprocating said molds to form said vessel and cause said half-plugs to penetrate said sheet to produce said whole plug and expel the hot foam from the space occupied by said whole plug into the areas of said vessel side wall immediately adjacent said hole, thereby increasing the density of said areas of said side wall.

2. A method as recited in claim 1 wherein there are provided recessed areas in at least one of the flat vessel-wall-defining surfaces of said matched molds adjacent said plugs whereby the expelled hot polystyrene foam which is displaced by said plugs forms reinforcing members adjacent the holes in the vessel.

* * * * *